US011836651B2

(12) United States Patent
Dabiri et al.

(10) Patent No.: US 11,836,651 B2
(45) Date of Patent: Dec. 5, 2023

(54) AUTOMATIC ADJUSTMENT OF REPLICA EXCHANGE

(71) Applicant: FUJITSU LIMITED, Kawasaki (JP)

(72) Inventors: Keivan Dabiri, Toronto (CA); Ali Sheikholeslami, Toronto (CA); Mehrdad Malekmohammadi, Toronto (CA); Hirotaka Tamura, Toronto (CA)

(73) Assignees: FUJITSU LIMITED, Kawasaki (JP); THE GOVERNING COUNCIL OF THE UNIVERSITY OF TORONTO, Toronto (CA)

( * ) Notice: Subject to any disclaimer, the term of this patent is extended or adjusted under 35 U.S.C. 154(b) by 104 days.

(21) Appl. No.: 17/142,083

(22) Filed: Jan. 5, 2021

(65) Prior Publication Data
US 2021/0279652 A1  Sep. 9, 2021

Related U.S. Application Data

(60) Provisional application No. 62/985,655, filed on Mar. 5, 2020.

(51) Int. Cl.
*G06Q 10/04* (2023.01)
*G06N 7/01* (2023.01)

(52) U.S. Cl.
CPC ............ *G06Q 10/04* (2013.01); *G06N 7/01* (2023.01)

(58) Field of Classification Search
None
See application file for complete search history.

(56) References Cited

U.S. PATENT DOCUMENTS

2020/0380065 A1* 12/2020 Tomita ............... G06Q 10/0631

OTHER PUBLICATIONS

W. D. Vousden, W. M. Farr, I. Mandel, Dynamic temperature selection for parallel tempering in Markov chain Monte Carlo simulations, Monthly Notices of the Royal Astronomical Society, vol. 455, Issue 2, Jan. 11, 2016, pp. 1919-1937, https://doi.org/10.1093/mnras/stv2422 (Year: 2016).*

(Continued)

*Primary Examiner* — Cory W Eskridge
(74) *Attorney, Agent, or Firm* — Maschoff Brennan

(57) ABSTRACT

According to an aspect of an embodiment, operations may include obtaining a first fixed temperature and a second fixed temperature of a replica exchange Markov Chain Monte Carlo (MCMC) process used to solve an optimization problem associated with a system, and obtaining a plurality of replicas of the system. The operations may also include obtaining a target swap acceptance probability with respect to swapping, during the replica exchange MCMC process, between replicas that correspond to adjacently ordered temperatures of a set of temperatures between the first fixed temperature and the second fixed temperature. The operations may include determining a respective average swap acceptance probability with respect to one or more respective adjacent pairs of temperatures. Further, the operations may include adjusting one or more of the variable temperatures based on a relationship between the target swap acceptance probability and each of one or more of the respective swap acceptance probabilities.

18 Claims, 6 Drawing Sheets

(56) References Cited

OTHER PUBLICATIONS

Z. Li and M. Parashar, "Grid-based asynchronous replica exchange," 2007 8th IEEE/ACM International Conference on Grid Computing, Austin, TX, USA, 2007, pp. 201-208, doi: 10.1109/GRID.2007.4354134. (Year: 2007).*

A. Valentim, M.G.E. da Luz, Carlos E. Fiore, Determining efficient temperature sets for the simulated tempering method, Computer Physics Communications, vol. 185, Issue 7,2014, pp. 2046-2055, ISSN 0010-4655, https://doi.org/10.1016/j.cpc.2014.04.010. (Year: 2014).*

F. Barahona, M. Grötschel, M. Jünger, and G. Reinelt,"An application of combinatorial optimization to statistical physics and circuit layout design," Operations Research, vol. 36, No. 3, pp. 493-513, 1988.

A. Fernández and S. Gómez, "Portfolio selection using neural networks," Computers & Operations Research, vol. 34, No. 4, pp. 1177-1191, 2007.

V. Kavalci, A. Ural, and O. Dagdeviren, "Distributed vertex cover algorithms for wireless sensor networks," International Journal of Computer Networks & Communications (IJCNC) vol. 6, No. 1, Jan. 2014.

S. Kirkpatrick, C. D. Gelatt, and M. P. Vecchi, "Optimization by simulated annealing," science, vol. 220, No. 4598, pp. 671-680, 1983.

F. Ortega-Zamorano, M. A. Montemurro, S. A. Cannas, J. M. Jerez, and L. Franco, "Fpga hardware acceleration of Monte Carlo simulations for the ising model." IEEE Trans. Parallel Distrib. Syst., vol. 27, No. 9, pp. 2618-2627, 2016.

M. Aramon et al., "Physics-inspired optimization for quadratic unconstrained problems using a digital annealer," Frontiers in Physics, vol. 7, article. 48, Apr. 2019.

D. J. Earl and M. W. Deem, "Parallel tempering: Theory, applications, and new perspectives," Physical Chemistry Chemical Physics, vol. 7, No. 23, pp. 3910-3916, Aug. 2005.

A. Kone and D. A. Kofke, "Selection of temperature intervals for parallel-tempering simulations," TThe Journal of Chemical Physics, vol. 122, No. 20, p. 206101, May 2005.

D. A. Kofke, "On the acceptance probability of replica-exchange Monte Carlo trials," The Journal of Chemical Physics, vol. 117, No. 15, pp. 6911-6914, Jul. 2002.

W. Vousden, W. M. Farr, and I. Mandel, "Dynamic temperature selection for parallel tempering in Markov chain Monte Carlo simulations," Monthly Notices of the Royal Astronomical Society, vol. 455, No. 2, pp. 1919-1937, Mar. 2016.

N. Metropolis, A. W. Rosenbluth, M. N. Rosenbluth, A. H. Teller, and E. Teller, "Equation of state calculations by fast computing machines," The Journal of Chemical Physics, vol. 21, No. 6, pp. 1087-1092, Jun. 1953.

D. H. Ackley, G. E. Hinton, and T. J. Sejnowski, "A learning algorithm for boltzmann machines," Cognitive science, vol. 9, No. 1, pp. 147-169, 1985.

A. Lucas, "Ising formulations of many np problems," Frontiers in Physics, vol. 2, p. 5, Jan. 2014.

C. J. Geyer, "Markov chain monte carlo maximum likelihood," School of Statistics, University of Minnesota, Interface Foundation of North America, 1991.

Y. Sugita and Y. Okamoto, "Replica-exchange molecular dynamics method for protein folding," Chemical Physics Letters, vol. 314, No. 1-2, pp. 141-151, Nov. 1999.

S. Kirkpatrick, "Optimization by simulated annealing: Quantitative studies," Journal of Statistical Physics, vol. 34, No. 5-6, pp. 975-986, 1984.

Yukito Iba, "Extended ensemble Monte Carlo," International Journal of Modern Physics C, vol. 12, No. 05, pp. 623-656, Jun. 2001.

C. Predescu, M. Predescu, and C. V. Ciobanu, "The incomplete beta function law for parallel tempering sampling of classical canonical systems," The Journal of chemical physics, vol. 120, No. 9, pp. 4119-4128, 2004.

Y. F. Atchadé, G. O. Roberts, and J. S. Rosenthal, "Towards optimal scaling of metropolis-coupled markov chain Monte Carlo," Statistics and Computing, vol. 21, No. 4, pp. 555-568, 2011.

K. Hukushima and K. Nemoto, "Exchange Monte Carlo method and application to spin glass simulations," Journal of the Physical Society of Japan, vol. 65, No. 6, pp. 1604-1608, Dec. 1995.

N. Rathore, M. Chopra, and J. J. De Pablo, "Optimal allocation of replicas in parallel tempering simulations," The Journal of chemical physics, vol. 122, No. 2, p. 024111, 2005.

B. Miasojedow, E. Moulines, and M. Vihola, "An adaptive parallel tempering algorithm," Journal of Computational and Graphical Statistics, vol. 22, No. 3, pp. 649-664, 2013.

M. K. Ła, CKI and B. Miasojedow,"State-dependent swap strategies and automatic reduction of number of temperatures in adaptive parallel tempering algorithm," Statistics and Computing, vol. 26, No. 5, pp. 951-964, Jun. 2015.

M. Matsumoto and T. Nishimura,"Mersenne twister: a 623-dimensionally equidistributed uniform pseudo-random number generator," ACM Transactions on Modeling and Computer Simulation (TOMACS), vol. 8, No. 1, pp. 3-30, 1998.

M. Baragatti, A. Grimaud, and D. Pommeret, "Parallel tempering with equi-energy moves," Statistics and Computing, vol. 23, No. 3, pp. 323-339, Jan. 2011.

S. Kou, Q. Zhou, W. H. Wong et al., "Equi-energy sampler with applications in statistical inference and statistical mechanics," The annals of Statistics, vol. 34, No. 4, pp. 1581-1619, Nov. 2006.

K. C. Chang, S. Shao, D. Zhang, and W. Zhang, "A simple algorithm for max cut," arXiv preprint arXiv:1803.06496, Aug. 2019.

F. Ma and J. K. Hao,"A multiple search operator heuristic for the max-k-cut problem," Annals of Operations Research, vol. 248, No. 1-2, pp. 365-403, Oct. 2015.

V. Shylo and O. Shylo, "Solving the maxcut problem by the global equilibrium search," Cybernetics and Systems Analysis, vol. 46, No. 5, pp. 744-754, 2010.

U. of Waterloo. Concorde tsp solver. [Online]. Available: http://www.math.uwaterloo.ca/tsp/concorde.html.

EP Search Report in Application No. 21158663.1 dated Jul. 15, 2021.

Dabiri et al., "Replica Exchange MCMC Hardware With Automatic Temperature Selection and Parallel Trial" IEEE Transaction on Parallel and Distributed Systems, vol. 31, No. 7, Jul. 2020.

Aramon et al., "Physics-Inspired Optimization for Quadratic Unconstrained Problems Using a Digital Annealer" Apr. 9, 2019.

Vousden et al., "Dynamic temperature selection for parallel-tempering in Markov chain Monte Carlo simulations", MNRAS 000, 1-21 (2002), Mar. 16, 2016.

Office Action in Application No. 21158663.1 dated Nov. 21, 2022.

Chinese Office Action issued in corresponding application No. 202110217073.6, dated Aug. 4, 2023.

* cited by examiner

AUTOMATIC ADJUSTMENT OF REPLICA EXCHANGE

CROSS-REFERENCE TO RELATED APPLICATION

This patent application claims the benefit of and priority to U.S. Provisional App. No. 62/985,655 filed Mar. 5, 2020, which is incorporated by reference in the present disclosure in its entirety.

FIELD

The embodiments discussed herein are related to automatic adjustment of replica exchange.

BACKGROUND

Combinatorial optimization problems are often categorized as NP-Problems (Nondeterministic Polynomial time Problems) such as NP-hard or NP-complete problems, in which there often are no known algorithms to solve such problems in polynomial time. Such combinatorial optimization problems may appear in numerous applications such as minimization of the number of vias in layout design, maximization of the return from a stock portfolio, airline routing and scheduling, and wireless sensor networks. Replica exchange processes may be used to help solve such optimization problems.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, operations may include obtaining a first fixed temperature of a replica exchange Markov Chain Monte Carlo (MCMC) process used to solve an optimization problem associated with a system, obtaining a second fixed temperature of the replica exchange MCMC process, and obtaining a plurality of replicas of the system to use in the replica exchange MCMC process. The operations may also include assigning each replica of the plurality of replicas to a different corresponding temperature of a set of temperatures of the replica exchange MCMC process. The set of temperatures may include the first fixed temperature, the second fixed temperature, and a plurality of variable temperatures that are numerically ordered between the first fixed temperature and the second fixed temperature. The operations may also include obtaining a target swap acceptance probability with respect to swapping, during the replica exchange MCMC process, between replicas that correspond to adjacently ordered variable temperatures of the plurality of variable temperatures. In addition, the operations may include determining a respective average swap acceptance probability with respect to one or more respective adjacent pairs of the plurality of variable temperatures. Each respective swap acceptance probability may be with respect to swaps between replicas assigned to the one or more respective adjacent pairs. Further, the operations may include adjusting, during the replica exchange MCMC process while maintaining the first fixed temperature and the second fixed temperature, one or more of the variable temperatures based on a relationship between the target swap acceptance probability and each of one or more of the respective swap acceptance probabilities. Moreover, the operations may include adjusting, during the replica exchange MCMC process, a number of replicas used during the MCMC process. The adjusting of the number of replicas may be based on a difference between the second fixed temperature and a particular variable temperature that is ordered adjacently to the second fixed temperature. The operations may also include identifying, based on an output of the replica exchange MCMC process, a particular state of the system as a solution to the optimization problem associated with the system.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Combinatorial optimization problems may include a class of optimization problems that may be used to determine a maximum or a minimum of a system. For example, combinatorial optimization may be used to minimize a number of vias of a circuit layout design, maximize stock returns, improve airline routing and scheduling, configure of wireless sensor networks, among other applications. In addition, simulated annealing may use a heuristic approach to obtain solutions to optimization problems. As such, annealing systems may be useful in helping solve combinatorial optimization problems, or any other applicable type of optimization problems.

Moreover, in some instances a replica exchange Markov Chain Monte Carlo (MCMC) process ("replica exchange process" also referred to as a parallel tempering process) may be used as a simulated annealing technique to determine the maximum or the minimum of a cost function as a solution to an optimization function. According to one or more embodiments of the present disclosure, and as detailed below, operations may be performed that may improve the efficiency of performing replica exchange, which may also improve the efficiency of solving optimization problems. The improved efficiency may improve the computing systems that are configured to solve optimization problems by reducing the amount of processing that may be performed by such computing systems. The improved efficiency may also decrease the amount of time used by computing systems in solving the optimization problems using replica exchange techniques.

Embodiments of the present disclosure are explained with reference to the accompanying drawings.

Figure 1A:
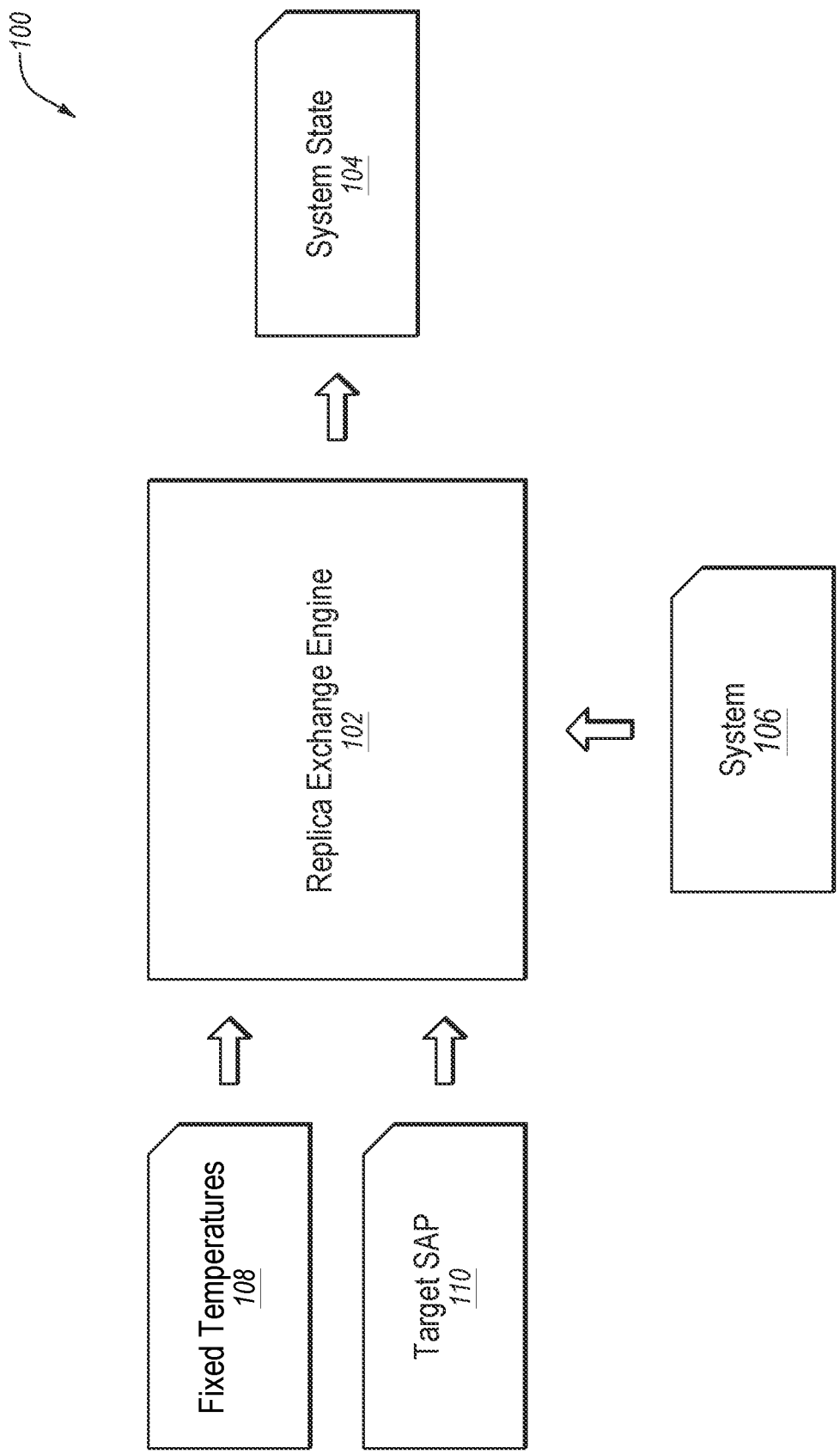
FIG. 1A is a diagram representing an example environment configured to perform a replica exchange process.

FIG. 1A is a diagram representing an example environment 100 configured to perform a replica exchange process, arranged in accordance with at least one embodiment described in the present disclosure. The environment 100 may include a replica exchange engine 102 ("engine 102") configured to output a system state 104 that may be a solution to an optimization problem related to a system 106.

The system 106 may include any suitable representation of an optimization problem that may be solved. For example, in some embodiments the system 106 may include a state vector X that may include a set of variables that may each represent a characteristic related to the optimization problem. The state vector X may accordingly represent different states of the system 106. For example, a first state vector X1 with variables each having first values may represent a first state of the system 106 and a second state vector X2 with the variables having second values may represent a second state of the system 106. In these or other embodiments, the difference between the state vectors X1 and X2 may be anywhere from only one corresponding variable in both X1 and X2 having a different value to every variable in X1 and X2 having different values.

By way of example, the system 106 may be a neural network that may include any suitable number of nodes (also referred to as "neurons"). In these or other embodiments, the state vector X may the system 106 may represent the states of each of the neurons of the neural network. For example, each neuron may be a bit that may have a value of "0" or "1" and the state vector X may include a "1" value or a "0" value for each neuron of the neural network. In these or other embodiments, the neural network may be configured to solve one or more different types of optimization problems in any suitable manner.

Additionally or alternatively, the system 106 may include an Ising Model that is mapped to the optimization problem to represent an Ising energy of optimization problem that corresponds to the system 106. For example, the Ising energy may be represented in the following expression (1):

$$E(X) = -\sum_{(i<j)} w_{ij}x_i x_j - \sum_i b_i x_i - C \quad (1)$$

In the above expression (1), $x_i$ is the $i_{th}$ variable of the state vector X and can be either 0 or 1, $w_{ij}$ is a connection weight between the $i_{th}$ and $j_{th}$ variables of X, $b_i$ is a bias associated with the $i_{th}$ element, and C is a constant offset term The engine 102 may include code and routines configured to enable a computing system to perform one or more of the operations described therewith. Additionally or alternatively, the engine 102 may be implemented using hardware including any number of processors, microprocessors (e.g., to perform or control performance of one or more operations), field-programmable gate arrays (FPGAs), application-specific integrated circuits (ASICs) or any suitable combination of two or more thereof.

Alternatively or additionally, the engine 102 may be implemented using a combination of hardware and software. In the present disclosure, operations described as being performed by the engine 102 may include operations that the engine 102 may direct a corresponding system to perform.

In some embodiments, the engine 102 may be included in or part of an annealing system (e.g., a digital annealing system or a quantum annealing system).

The engine 102 may be configured to perform a replica exchange MCMC process ("replica exchange" or "parallel tempering") with respect to the system 106. For example, the engine 102 may be configured to perform replica exchange to find a state vector Xmin that may minimize the Ising energy of the system 106. As another example, the engine 102 may be configured to perform replica exchange to find a state vector Xmax that may maximize the Ising energy of the system 106.

Replica exchange may include running M copies of the system 106 simultaneously but with different scaling factors that influence whether a change to the system occurs during the running of the copies of the system 106. For example, "running" a copy of the system 106 may include performing a set of multiple iterations in which each iteration includes randomly generating (e.g., via a stochastic process) a proposed sample of the current state vector "$X_i$" to obtain a proposed sample "$X_{i+1}$". In addition, it may be determined in each iteration whether to replace $X_i$ with $X_{i+1}$. The determination as to whether to make the replacement may be a function of the scaling factor. As such, running the system 106 at different scaling factors may lead to varying results because the replacement determination may vary. For example, a first scaling factor set to a first value may result in replacement a majority of the time and a second scaling factor set to a second value may result in replacement a small minority of the time. As such, running a first copy of the system 106 with respect to the first scaling factor may yield greatly varying results as compared to running a second copy of the system 106 with respect to the second scaling factor.

By way of example, in some embodiments, for types of problems that may be described as a set of interacting particles, the probability of the system 106 residing in a particular state $X_i$, may be given as a Boltzmann distribution function (2) as follows:

$$\prod(X_i) = \frac{1}{Z} e^{-\frac{E(X_i)}{k_B T}}, \quad (2)$$

$$\text{where } Z = \sum_i e^{-\frac{E(X_i)}{k_B T}}$$

In the above expression (2), $E(X_1)$ is the energy of the system in the state $X_i$, T is the scaling factor of the system, $k_B$ is the Boltzmann constant, and Z is a normalization factor, which may also be referred to as a partition function.

In addition, in this example, a transition probability T with respect to the probability that the proposed sample $X_{i+1}$ will be accepted may be expressed as follows in expression (3):

$$T(X_i \rightarrow X_{i+1}) = \min\left\{1, \frac{\prod(X_{i+1})}{\prod(X_i)}\right\} \quad (3)$$

A combination of expressions (3) and (2) may yield the following expression (4):

$$T(X_i \rightarrow X_{i+1}) = \min\left\{1, e^{\frac{-\Delta E}{T}}\right\} \quad (4)$$

In expression (4), $\Delta E = E(X_{i+1}) - E(X_i)$ and the Boltzmann constant $k_B$ may be dropped. Additionally, as the transition probability T approaches "1", the probability of acceptance of proposed sample $X_{i+1}$ approaches 100%. Additionally, as also indicated in expression (4), the higher the value of the scaling factor T, the closer the expression $e^{-\Delta E/T}$ approaches "1". Therefore, in the above example, the higher the scaling factor T, the more likely it is that the proposed sample $X_{i+1}$ will be accepted. Conversely, the lower the scaling factor T, the less likely it is that the proposed sample $X_{i+1}$ will be accepted. In instances in which the maximum energy is of interest (e.g., a maximization problem instead of a minimization problem), the same formulations may be used by flipping the entire energy landscape as formulated in expression (1).

In the present disclosure, the term "temperature" is used as a synonym of "scaling factor" due to the term "temperature" being commonly used in the field of simulated and digital annealing as a synonym of a scaling factor. In traditional annealing and parallel tempering, physical systems may be run at different actual temperatures to solve for certain problems and the term "temperature" has carried over for techniques that use the same principles for the solving of optimization problems for other types of "systems." As such, use of the term "temperature" in the present disclosure is used for consistency of use of the term in the field of simulated and digital annealing even though it does not necessarily refer to actual, physical temperature. Instead, the term "temperature" may refer to any factor that may affect the Ising energy of a system in a manner that may affect the transition probability from one state to another, which may be used as the basis for accepting or rejecting a proposed state of the system such as described above. Similarly, in the present disclosure, reference to the Ising energy of a system (e.g., the system 106) is not necessarily the actual energy of the system, but is more broadly used as a representation of the state of the system. For example, an Ising energy value may be returned for the system that may represent the state of the system, such as a cost, profit, etc. of the system. As a further example, in instances in which cost is being analyzed, the optimization problem may be such to minimize the Ising energy. Conversely, in instances in which profits are being analyzed, the optimization problem may be such to maximize the Ising energy.

As indicated above, the engine 102 may be configured to run M replicas of the system 106, each at a different temperature. As such, the engine 102 may be configured to obtain M replicas of the system 106 and assign each of the replicas to one of M different temperatures of a set of temperatures. In some embodiments, the replicas of the system may each be or include a state vector X of the system 106. In some embodiments, the initial state vectors of each replica may be identical. Additionally or alternatively, the engine 102 may be configured to randomly generate the initial state vector of each replica such that the state vectors of two or more replicas may differ. The set of temperatures is often referred to as temperature ladder. The temperatures of the temperature ladder may be numerically ordered between a low temperature and a high temperature. Therefore, the assigning of the replicas to a respective temperature may be such that the M different replicas are ordered according to the ordering of the respective temperatures to which the replicas are assigned.

Due to the scaling impact of temperatures on the state of the system 106, replicas at higher temperatures are able to sample larger portions of the state, while the replicas at lower temperatures take a large number of samples in local regions of the state. The replica exchange may include swapping replicas that correspond to adjacent temperatures such that, compared to a standard MCMC process, a more representative view of the state may be achieved by exchanging replicas. For example, a first replica that is assigned to a first temperature may swap with a second replica that is assigned to a second temperature such that the first replica may be assigned to the second temperature and the second replica may be assigned to the first temperature. The first temperature and the second temperature may be adjacent to each other in the temperature ladder. Further, the first replica and the second replica may be considered adjacent replicas by being assigned to adjacent temperatures (e.g., the first temperature and the second temperature).

In some embodiments, after each certain number of MCMC iterations during the replica exchange process, the engine 102 may make a determination with respect to swapping configurations (or equivalently, swapping temperatures) of two or more replicas. In some embodiments, the determination may be made with respect to adjacent replicas. Additionally or alternatively, the determination may be made with respect to each possible set of adjacent replicas.

In these or other embodiments, the determination as to whether to swap may be based on a swap acceptance probability (SAP). The SAP may be determined based on the temperature difference and the energy difference between adjacent replicas in some embodiments. For example, in some embodiments, the SAP may be determined using a Metropolis solution according to the following expression (5):

$$SAP = \min\{1, \exp[(\beta_i - \beta_j)(E_i - E_j)]\} \quad (5)$$

In expression (5), $\beta_i$ and $\beta_j$ represent the inverses of adjacent temperatures, and $E_i$ and $E_j$ represent the energies of the two corresponding replicas.

Expression (5) indicates that at the time of a swap, replicas with lower energy, are more likely to descend to lower temperatures and vice versa. Because, if $E_i < E_j$ and $T_i > T_j$, SAP will be equal to 1. Further, if a certain replica at low temperatures gets stuck at a local minimum, due to the non-zero SAP between all temperatures, it is eventually able to ascend to higher temperatures during the replica exchange process if enough determinations are made, and hence, escape from that local minimum (because the depth of local minima is smaller in higher temperatures).

The temperature selection may have a significant impact on the efficiency of sampling and the time to reach the solution. For example, at lower temperatures, more details regarding the state may be identified due to the lower transition probability, such as indicated in expression (4) above. However, the extra details may come at a cost of performing a large number of iterations to obtain such information and to get out of local minimums. Conversely, at higher temperatures, the state details may be masked due to the higher transition probability. Therefore, the selection of the temperature range, including the high and low temperatures, as well as the number of and spacing between temperatures may impact the efficiency and performance accuracy of the replica exchange process.

Figure 1B:
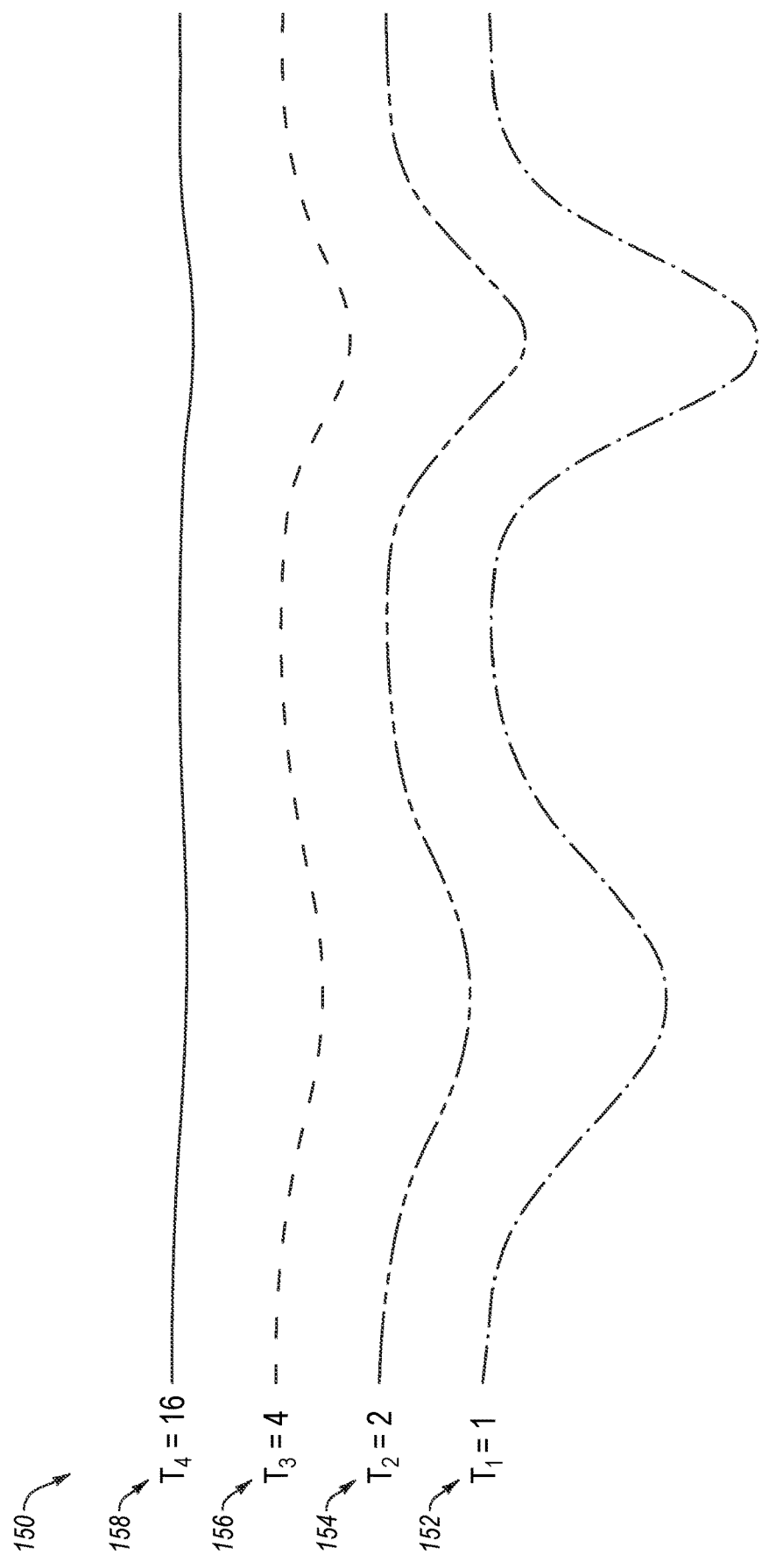
FIG. 1B illustrates different representations of an example state based on different temperatures.

As an example, FIG. 1B illustrates different representations of an example state 150 based on different temperatures. In particular, FIG. 1B illustrates a first representation 152 at a first temperature $T_1$ of "1", a second representation 154 at a second temperature $T_2$ of "2", a third representation 156 at a third temperature $T_3$ of 4, and a fourth representation 158 at a fourth temperature $T_4$ of 16. As indicated by a comparison between the different representations, in FIG. 1B, the details of the state may be reduced as the temperature increases such that the fourth representation 158 may be significantly "flatter" than the first representation 152.

In some embodiments, the engine 102 may be configured to obtain fixed temperatures 108, which may include a first fixed temperature and a second fixed temperature. In some embodiments, the engine 102 may obtain the fixed temperatures 108 as inputs. Additionally or alternatively, the engine 102 may be configured to determine the fixed temperatures 108. The first fixed temperature and the second fixed temperature may dictate the range of the temperature ladder such that they may be the highest and lowest temperatures of the temperature ladder ("fixed high temperature" and "fixed low temperature").

In some embodiments, the fixed low temperature may be set such that the scaling impact of temperature does not mask the details of the state. For example, the fixed low temperature may be based on a relationship between the transition probability and the fixed low temperature and how such a relationship affects details about the state that may be obtained at the fixed low temperature. The fixed low temperature may be set according to any suitable technique and may depend on the specific formulation of the Ising energy function used for the optimization problem. Further, the fixed low temperature may be based on the error tolerances that may be associated with the particular implementation.

The fixed high temperature may be set such that it is high enough that no replica gets trapped in a local minimum, and the majority of transition proposals are accepted, meaning that the state representation at the fixed high temperature is almost flat. In these or other embodiments, the fixed high temperature may also be based on a relationship between the transition probability and the fixed high temperature and how such a relationship affects details about the state and the likelihood of being trapped in a local minimum. For example, the fixed high temperature may be selected until the transition probability reaches a particular level (e.g., 80% or higher). Based on expression (4) the probability of transition changes by the scaling factor. By increasing the highest temperature and recording the transition probability the value of the highest temperature according to a particular target transition probability for the highest temperature may be obtained.

During replica exchange, in instances in which SAP is uniform between all adjacent temperatures, the replicas may perform a random walk in the temperature space in which each replica spends the same amount of time at each temperature since at any time, for any replica at any temperature, the probabilities of moving to the higher or lower temperatures are equal. Additionally, choosing the temperature spacings of the temperature ladder to create uniform SAP is commonly used as a mechanism to optimize the replica exchange process.

According to one or more embodiments of the present disclosure, the engine 102 may be configured to automatically adjust the temperatures of the temperature ladder that are between the fixed temperatures 108 to achieve a uniform SAP between all adjacent temperatures. In the present disclosure, the temperatures that may be adjusted and that are between the fixed temperatures 108 may be referred to as "variable temperatures." In these and other embodiments, the engine 102 may be configured to add or remove replicas and corresponding temperatures during the replica exchange process to help avoid running more replicas than necessary while also helping run enough replicas to converge on a uniform SAP. The adding and/or removing of replicas may thus improve resource runtime and efficiency by performing operations on enough replicas to come to a sufficiently acceptable solution while also avoiding performing operations on more replicas than needed to obtain such a solution.

In some embodiments, the engine 102 may be configured to obtain a target SAP value 110 as the uniform SAP to achieve with respect to all the adjacent temperatures. The target SAP value 110 may be determined or based on one or more factors such as experimental results on the system of interest or systems with similar structures. Additionally or alternatively, the target SAP value may be based on a balance between accuracy of the resulting solution and amount of resources that may be used to determine the solution and may be determined empirically. As such, the target SAP value may vary according to different implementations.

The engine 102 may be configured to adjust one or more of the variable temperatures during the replica exchange process to adjust the SAP between adjacent pairs. The adjustment may be based on the target SAP to attempt to have the SAP between the adjacent pairs to arrive at the target SAP or within a threshold of the target SAP. However, in some embodiments, and as detailed further below, the SAP between the first fixed temperature and its adjacent variable temperature or between the second fixed temperature and its corresponding adjacent variable temperature (e.g., between the fixed high temperature and the highest variable temperature in a minimization scenario or between the fixed low temperature and the lowest variable temperature in a maximization scenario) may not be adjusted to allow for replica insertion or removal. Note that a particular temperature and corresponding replica may be part of more than one adjacent pair. For example, for a set of ordered temperatures [T1, T2, T3], a first adjacent pair may include temperatures T1 and T2, and a second adjacent pair may include temperatures T2 and T3. As such, the same temperature (and corresponding replica) may be included in two different adjacent pairs. In some embodiments, the temperature adjustment may be performed according to one or more operations described below with respect to FIG. 3.

In these or other embodiments, the engine 102 may be configured to adjust the number of replicas (and consequently adjust the number of temperatures) that may be run during the replica exchange process. In some embodiments, as indicated above and as detailed further below, the adjustment of the number of replicas may be based on a temperature difference between one of the fixed temperatures 108 and its adjacent variable temperature. For example, for minimization problems, the adjustment may be based on the temperature difference between the fixed high temperature and the highest variable temperature and for maximization problems, the adjustment may be based on the temperature difference between the fixed low temperature and the lowest variable temperature. In some embodiments, the replica number adjustment may be related to the temperature adjustment as described in further detail below. Additionally or alternatively, the replica number adjustment may be performed according to one or more operations described below with respect to FIG. 4.

The engine 102 may be configured to perform the replica exchange including the temperature adjustment and/or the replica number adjustment until the replica exchange process converges in which swap acceptance probability for each of the temperature pairs is equal to or within a particular threshold of the target SAP. Additionally or alternatively, the engine 102 may output the system state 104 in response to convergence of the replica exchange process. The system state 104 may indicate the state of the system 106 that corresponds to the convergence of the replica exchange process and may also be a solution to the optimization problem related to the system 106. For example, the system state 104 may include one or more state vectors X in which the Ising energy may be minimized or maximized, depending on whether the optimization problem is a maximization problem or a minimization problem.

Modifications, additions, or omissions may be made to FIG. 1A without departing from the scope of the present disclosure. For example, the environment 100 may include more or fewer elements than those illustrated and described in the present disclosure. Further, the specific configuration, association, or inclusion of the elements in particular devices or systems may vary depending on specific implementations.

Figure 2:
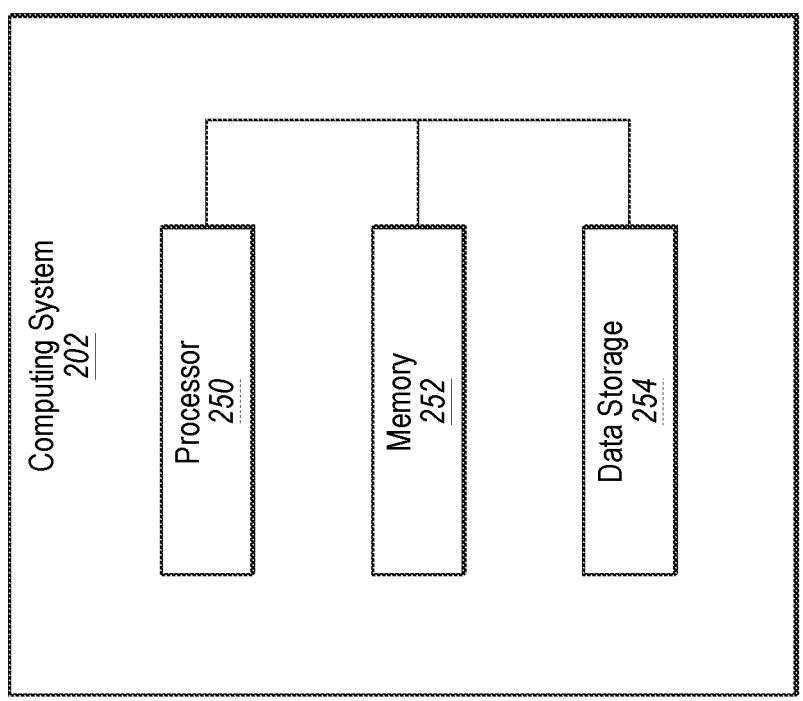
FIG. 2 illustrates a block diagram of an example computing system configured to perform a replica exchange process.

FIG. 2 illustrates a block diagram of an example computing system 202 configured to perform a replica exchange process, according to at least one embodiment of the present disclosure. The computing system 202 may be configured to implement or direct one or more operations associated with the replica exchange engine 102 of FIG. 1A in some embodiments. In some embodiments, the computing system 202 may be included in or form part of an annealing system. The computing system 202 may include a processor 250, a memory 252, and a data storage 254. The processor 250, the memory 252, and the data storage 254 may be communicatively coupled.

In general, the processor 250 may include any suitable special-purpose or general-purpose computer, computing entity, or processing device including various computer hardware or software modules and may be configured to execute instructions stored on any applicable computer-readable storage media. For example, the processor 250 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 250 may include any number of processors configured to, individually or collectively, perform or direct performance of any number of operations described in the present disclosure. Additionally, one or more of the processors may be present on one or more different electronic devices, such as different servers.

In some embodiments, the processor 250 may be configured to interpret and/or execute program instructions and/or process data stored in the memory 252, the data storage 254, or the memory 252 and the data storage 254. In some embodiments, the processor 250 may fetch program instructions from the data storage 254 and load the program instructions in the memory 252. After the program instructions are loaded into memory 252, the processor 250 may execute the program instructions.

The memory 252 and the data storage 254 may include computer-readable storage media for carrying or having computer-executable instructions or data structures stored thereon. Such computer-readable storage media may include any available non-transitory media that may be accessed by a general-purpose or special-purpose computer, such as the processor 250. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other non-transitory storage medium which may be used to carry or store particular program code in the form of computer-executable instructions or data structures and which may be accessed by a general-purpose or special-purpose computer. In these and other embodiments, the term "non-transitory" as explained in the present disclosure should be construed to exclude only those types of transitory media that were found to fall outside the scope of patentable subject matter in the Federal Circuit decision of In re Nuuten, 500 F.3d 1346 (Fed. Cir. 2007). Combinations of the above may also be included within the scope of computer-readable media.

Combinations of the above may also be included within the scope of computer-readable storage media. Computer-executable instructions may include, for example, instructions and data configured to cause the processor 250 to perform a certain operation or group of operations.

Modifications, additions, or omissions may be made to the computing system 202 without departing from the scope of the present disclosure. For example, in some embodiments, the computing system 202 may include any number of other components that may not be explicitly illustrated or described. In addition, reference to hardware or operations performed by hardware in the present disclosure may refer to any applicable operation, configuration, or combination of one or more of the elements of the computing system 202.

Figure 3:
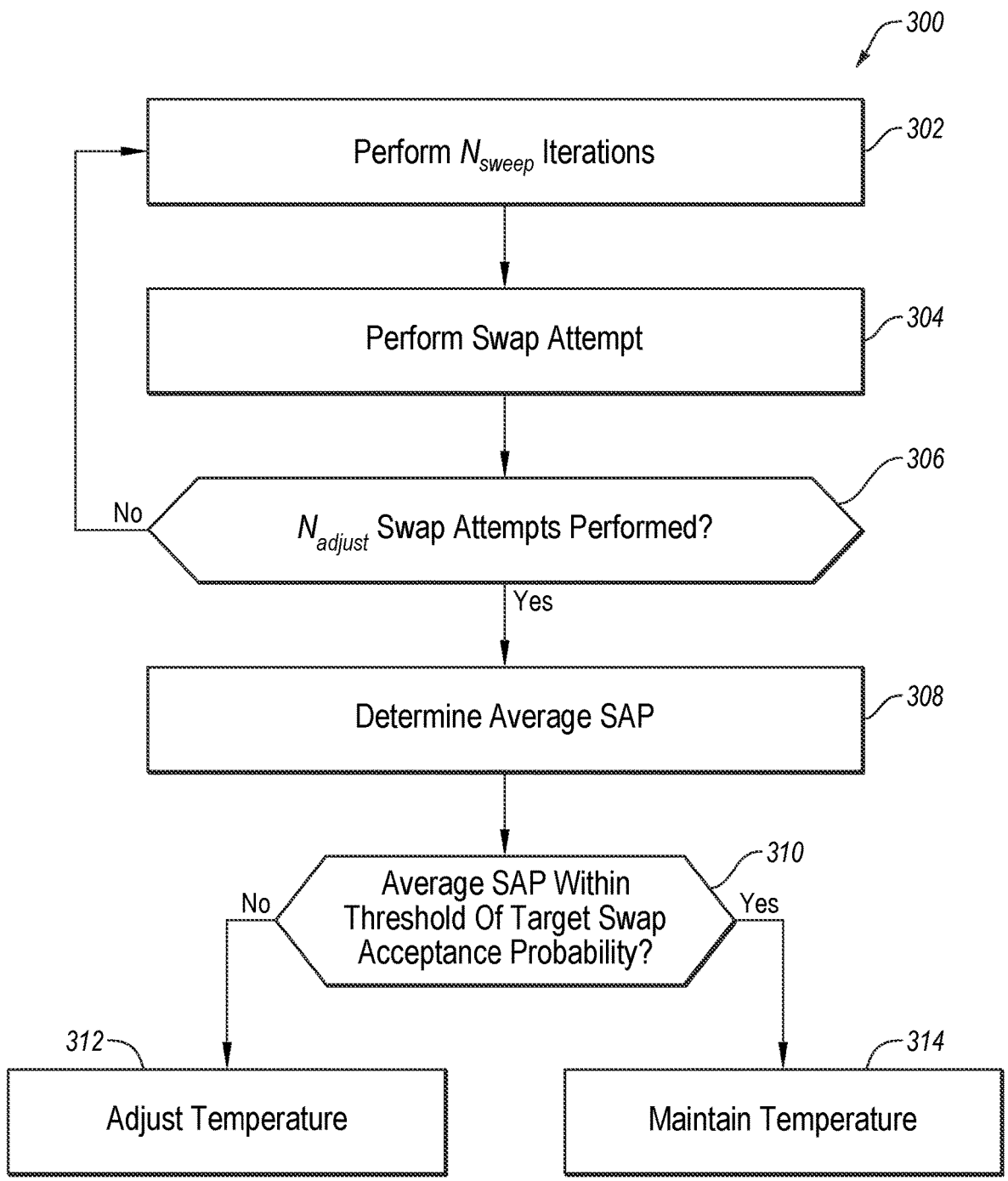
FIG. 3 illustrates a flowchart of an example method of adjusting temperature during a replica exchange process.

FIG. 3 illustrates a flowchart of an example method 300 of adjusting temperature during a replica exchange process, according to at least one embodiment described in the present disclosure. The method 300 may be performed by any suitable system, apparatus, or device. For example, the engine 102 of FIG. 1 or the computing system 202 of FIG. 2 may perform one or more of the operations associated with the method 300. Although illustrated with discrete blocks, the steps and operations associated with one or more of the blocks of the method 300 may be divided into additional blocks, combined into fewer blocks, or eliminated, depending on the particular implementation.

At block 302, $N_{sweep}$ number of MCMC iterations of an MCMC replica exchange process that may be performed to solve an optimization problem of a system. $N_{sweep}$ may be set to any value. In some embodiments, $N_{sweep}$ may be set to the lowest possible value such that the runtime of the hardware performing the swaps is masked by the runtime of MCMC iterations. The MCMC iterations may be performed with respect to each of M number of replicas of the system that each are assigned to and thus correspond to one of M different temperatures. The replicas may each include a state vector X of the system. The temperatures may be numerically ordered as a temperature ladder with values between a fixed low temperature and a fixed high temperature in some embodiments. The temperatures of the temperature ladder that are between the fixed high temperature and the fixed low temperature may be adjusted according to the method 300, as detailed below, and may be referred to as "variable temperatures."

In these or other embodiments, for each iteration of the $N_{sweep}$ number of MCMC iterations, a proposed sample of each respective replica (e.g., a proposed state vector) may be accepted or rejected as a replacement for the respective replica. In some embodiments, the acceptance or rejection of the proposed sample may be based on a transition probability T, such as that described above with respect to expression (4). In some embodiments, the generation of and acceptance or rejection of two or more proposed replicas may be performed in parallel. Additionally or alternatively, the generation of and acceptance or rejection of proposed replicas may be performed in parallel with respect to all the replicas.

In response to $N_{sweep}$ MCMC iterations being performed, the method 300 may proceed to block 304. At block 304, a swap attempt operation may be performed with respect to each adjacent pair of replicas and corresponding temperatures. In some embodiments, the swap between each adjacent pair may be accepted or rejected based on an SAP determination made using expression (5) above.

At block 306, it may be determined whether $N_{adjust}$ number of swap attempts have been performed with respect to each adjacent pair. $N_{adjust}$ is a value that is large enough to reduce the sampling noise and may be determined empirically in some embodiments. By way of example, in many cases 50 to 100 may be an appropriate number of samples. In response to $N_{adjust}$ number of swap attempts not having been performed yet, the method 300 may return to block 302. In contrast, in response to $N_{adjust}$ number of swap attempts having been performed, the method 300 may proceed to block 308.

At block 308, an average SAP may be determined for each of one or more of the adjacent pairs of temperatures. The average SAP of a respective adjacent pair of temperatures may indicate the average SAP for those temperatures with respect to the $N_{adjust}$ number of swap attempts. For example, in an instance in which $N_{adjust}$ is equal to "1" the average SAP for a respective pair may be equal to the SAP of the swap attempt for the respective pair. As another example, in an instance in which $N_{adjust}$ is equal to "100", the average SAP for a respective pair may be the average SAP for the pair over the 100 different swap attempts.

In some embodiments, the average SAP may be determined using a standard averaging technique. For example, the average SAP for each respective adjacent pair may be determined by determining the SAP (e.g., via expression (5)) for each swap attempt of the respective adjacent pair, adding each determined SAP together, and dividing by the number of swap attempts.

Additionally or alternatively, in some embodiments the average SAP for each respective adjacent pair may be determined based on a swap acceptance rate that may indicate the rate at which a swap was accepted for the respective adjacent pairs in the $N_{adjust}$ number of swap attempts. The swap acceptance rate over the $N_{adjust}$ number of swap attempts may accordingly be based on the average of the SAP's used to determine whether or not to make a swap over the $N_{adjust}$ number of swap attempts. As such, the swap acceptance rate for each respective adjacent pair may be equal to or approximately equal to the average SAP of the respective adjacent pairs.

The swap acceptance rate for a particular adjacent pair of temperatures may be equal to the number of accepted swaps for that adjacent pair over the number of attempted swaps. For instance, the swap acceptance rate for a particular pair "i" may be expressed as follows in expression (6):

$$\text{Swap Acceptance Rate} = \frac{\text{accepted swaps for pair } i}{N_{adjust}} \quad (6)$$

In some embodiments, the average SAP may be determined for every adjacent pair except for an adjacent pair that includes the fixed high temperature or the fixed low temperature. For example, in a minimization scenario, the average SAP of the adjacent pair of the fixed high temperature and the highest variable temperature may not be determined. As another example, in a maximization scenario, the average SAP of the adjacent pair of the fixed low temperature and the lowest variable temperature may not be determined.

At block 310, the average SAP for each of the one or more adjacent pairs may be compared against a target swap acceptance probability (target SAP). In response to the average SAP being outside a threshold of the target SAP for a respective adjacent pair, the method 300 may proceed to block 312. In response to the average SAP being within the threshold of the target SAP for a respective adjacent pair, the method 300 may proceed to block 314.

The threshold may be based on a number of factors including a target margin of error for a solution to the corresponding optimization problem, a target processing efficiency, etc. For example, the threshold may be a percentage variation from the target SAP (e.g., being within a particular percentage of the target SAP) in which a higher percentage variation may correspond to a higher margin of error but better processing efficiency. In contrast, a lower percentage variation may correspond to a lower margin of error but less efficient processing. As such, the threshold may have a value within a relatively wide range, such as being anywhere between 0.1% to 20% of the target SAP.

At block 312, a temperature adjustment may be made with respect to a temperature difference between respective adjacent temperature pairs that have an average SAP that is not within the threshold of the target SAP. The temperature adjustment may be made such that the swap acceptance probability for the respective adjacent pairs may be moved toward the target SAP.

For example, as indicated by expression (5), an increase in the temperature difference between a particular adjacent pair may result in a decrease in the swap acceptance probability for the particular adjacent pair. Therefore, in instances in which the average SAP is greater than the target SAP and outside of the threshold, the temperature difference may be decreased. Conversely, as also indicated by expression (5), a decrease in the temperature difference between a particular adjacent pair may result in an increase in the swap acceptance probability for the particular adjacent pair. Therefore, in instances in which the average SAP is less than the target SAP and outside of the threshold, the temperature difference may be increased.

Temperature adjustments may disrupt the convergence of the replica exchange process. As such, the magnitude of the temperature adjustments may be diminished over time to help ensure that convergence of the replica exchange process may occur. For example, a damping factor α may be applied to the temperature adjustment and may be a function of the number of attempted swaps. In some embodiments, the dampening factor may be determined according to expression (7) as follows:

$$\alpha(t) = \alpha_0 \frac{t_0}{t + t_0} \quad (7)$$

In expression (7), t may represent the number of attempted swaps from the beginning of the replica exchange process, $\alpha_0$ may represent the initial damping factor, and $t_0$ may represent the time at which the damping factor is reduced to half of its initial value. The initial damping factor may be based on a balance between accuracy of the resulting solution and amount of time and/or resources that may be used to determine the solution and may be determined empirically. For example, a low value of the initial damping factor may result in a slow adjustment and consequently a slow arrival to a solution, which may use more time and computing resources. By contrast, a high value of the initial damping factor may result in a faster adjustment, but a less accurate solution. As such, the initial damping factor value may vary according to different implementations.

Additionally, by way of example, the temperature adjustment for a respective adjacent pair of temperatures may be according to expression (8) below in some embodiments:

$$\Delta T_j^i = \begin{cases} \alpha(t) \times (T_j - T_i), SAP_j^i > SAP_{target} + 5\% \\ -\alpha(t) \times (T_j - T_i), SAP_j^i < SAP_{target} - 5\% \end{cases}$$

In expression (8), $\Delta T_j^i$ may be the change in the temperature difference between temperatures $T_i$ and $T_j$ of the respective adjacent pair of temperatures, $\alpha(t)$ may be determined from expression (7), $SAP_j^i$ may be the average SAP between temperatures $T_i$ and $T_j$, $SAP_{target}$ may be the target SAP, and the threshold may be 5% in this particular example. The temperature adjustment for the respective adjacent pairs may include adjusting the lower temperature, adjusting the higher temperature, or adjusting both the lower and the highest temperature. In some embodiments, for a minimization process, the higher temperature of the respective adjacent pair may be adjusted and the lower temperature may be maintained, which may make implementation easier due to other temperature adjustments that may be made as described below. Additionally or alternatively, for a maximization process, the lower temperature of the respective adjacent pair may be adjusted and the higher temperature may be maintained, which may also ease implementation.

The temperature adjustment between one adjacent pair may affect the temperature difference between an adjacent pair that is adjacent to the adjacent pair. For example, a temperature adjustment may be made to a first adjacent pair that includes a first temperature T1 and a second temperature T2. The first adjacent pair may be considered as being adjacent to a second adjacent pair that includes T2 and a third temperature T3. An adjustment may be made to T2 in response to the SAR of the first adjacent pair not being within the threshold of the target SAP. The adjustment to T2 may however also change the swap acceptance probability between the second adjacent pair of T2 and T3 by changing the difference between T2 and T3. Therefore, in some embodiments, adjustments may be made to one or more additional temperatures in response to making a temperature adjustment with respect to a particular pair of adjacent temperatures. The adjustments may be such that the temperature differences between other pairs of adjacent temperatures may be maintained.

For example, in response to a temperature adjustment that increases a particular variable temperature by $\Delta T$, all of the variable temperatures that are higher than the particular variable temperature may also be increased by $\Delta T$. Similarly, in response to a temperature adjustment that decreases the particular variable temperature by $\Delta T$, all of the variable temperatures that are lower than the particular variable temperature may also be decreased by $\Delta T$.

Additionally or alternatively, one or more of the adjustments to one or more of the other variable temperatures may be less than $\Delta T$ in some instances. For example, an increase to a first variable temperature by $\Delta T$ may be such that the first variable temperature is now greater than a second variable temperature that is higher in the temperature ladder than the first variable temperature. In some embodiments, to avoid such a scenario, the increase in the first variable temperature may be such that the difference between the first variable temperature and the second variable temperature may be reduced by a certain percentage. For example, the temperature difference between the first variable temperature and the second variable temperature may be reduced by 5% such that the temperature difference may be adjusted to be 95% compared to what it was. A similar approach may also be used in scenarios in which the temperatures are being decreased. In these and other embodiments, the changes may be made iteratively starting from the adjusted variable temperature of the respective adjacent pair and moving in order through the temperature ladder.

The fixed temperatures may not be adjusted as part of the temperature adjustment process, which may affect the temperature difference between the fixed high temperature and the highest variable temperature or between the fixed low temperature and the lowest variable temperature depending on whether the replica exchange process is performed as a minimization process or a maximization process. For example, for a minimization process, an increase in a temperature difference between a pair of adjacent variable temperatures, and the subsequent adjustment to one or more higher temperatures, may result in the temperature difference between the fixed high temperature and the highest variable temperature decreasing. Similarly, for the minimization process, a decrease in a temperature difference between a pair of adjacent variable temperatures, and the subsequent adjustment to one or more higher temperatures, may result in the temperature difference between the fixed high temperature and the highest variable temperature increasing. The inverse may be the case for a maximization process. As detailed below with respect to FIG. 4, the temperature difference associated with a fixed temperature may be used to determine whether to add or remove replicas.

At block 314, for pairs of adjacent temperatures that are within the threshold of the target SAP, the temperature difference between such adjacent pairs may be maintained. The "maintaining" of this difference may include an adjustment of the difference by a certain percentage during the temperature adjustment of block 312 with respect to the scenarios described above regarding avoiding a lower temperature of a particular pair of adjacent temperatures becoming the higher temperature of the particular pair.

Modifications, additions, or omissions may be made to the method 300 without departing from the scope of the present disclosure. For example, the operations of method 300 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

For example, in some embodiments, after blocks 312 and 314, the method 300 may return to block 302 to repeat one or more of the operations of the method 300. Additionally or alternatively, this process may be repeated until the average SAP between all the adjacent temperatures is within the threshold of the target SAP, which may indicate convergence of the replica exchange process. In these or other embodiments, a solution to the optimization problem associated with the system that corresponds to the replicas may be based on the state vectors of the replicas at convergence.

Figure 4:
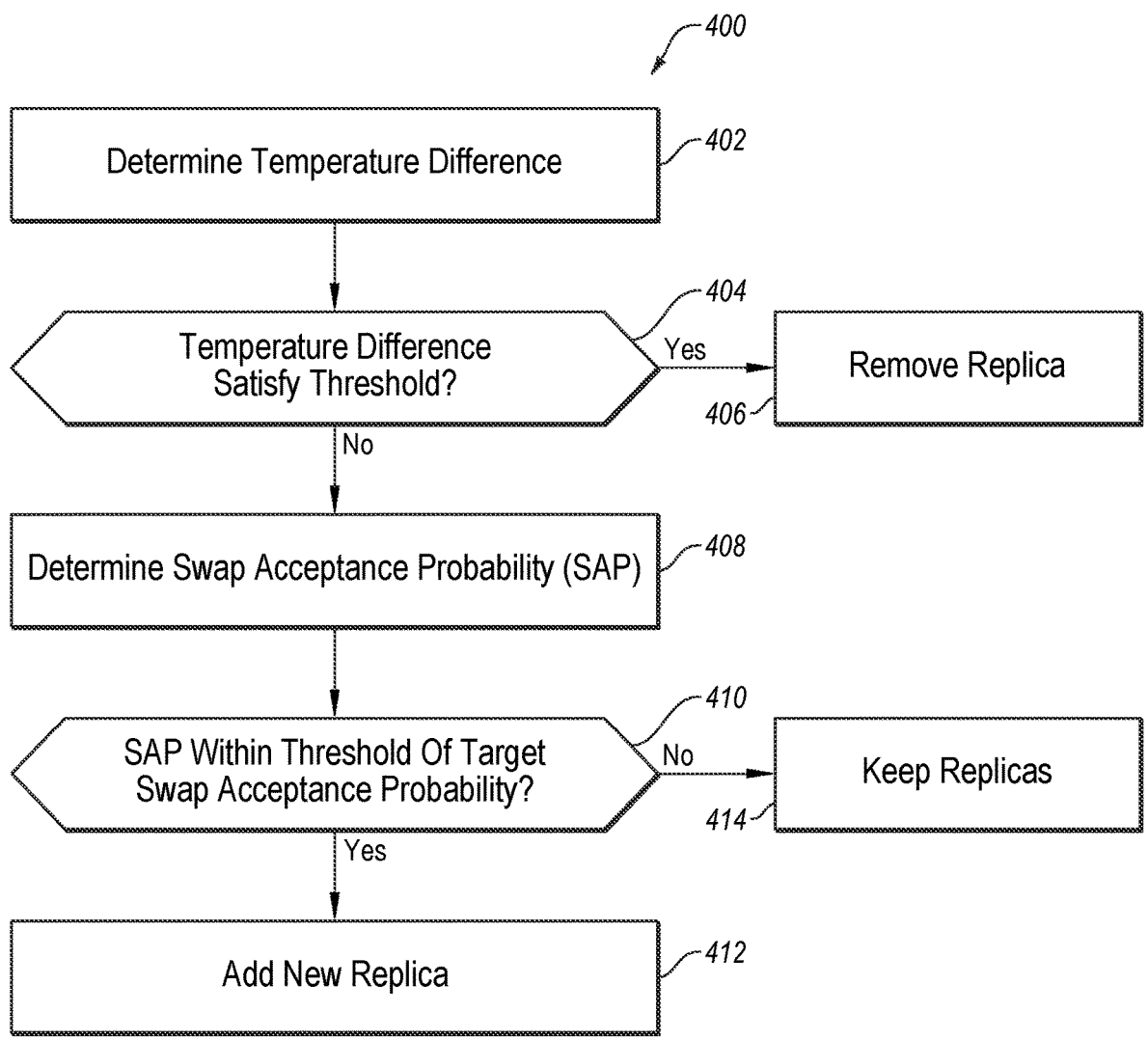
FIG. 4 illustrates a flowchart of an example method of adjusting a number of replicas during a replica exchange process.

FIG. 4 illustrates a flowchart of an example method 400 of adjusting a number of replicas during a replica exchange process, according to at least one embodiment described in the present disclosure. The method 400 may be performed by any suitable system, apparatus, or device. For example, the engine 102 of FIG. 1 or the computing system 202 of FIG. 2 may perform one or more of the operations associated with the method 400. Although illustrated with discrete blocks, the steps and operations associated with one or more of the blocks of the method 400 may be divided into additional blocks, combined into fewer blocks, or eliminated, depending on the particular implementation.

As indicated above, the temperature difference associated with the fixed high temperature or the fixed low temperature of a temperature ladder of the replica exchange process may be used to determine whether to add or remove replicas. In instances in which the replica exchange process is performed with respect to a maximization, the difference between the fixed low temperature and the lowest variable temperature may be used. Conversely, in instances in which the replica exchange process is performed with respect to a minimization, the difference between the fixed high temperature and the highest variable temperature may be used. The operations of the method 400 are described with respect to a minimization process to ease the explanation, but the same principles may apply with respect to a maximization process, just with the fixed low temperature and the lowest variable temperature.

At block 402, a temperature difference may be determined between the fixed high temperature and the highest variable temperature. The temperature difference determined at block 402 may be referred to as a "last temperature difference" to indicate that it is the last temperature difference in the temperature ladder. Further, the fixed high temperature and the highest variable temperature may also be referred to as the "last adjacent pair." In some embodiments, the last temperature difference determination may be performed after each temperature adjustment iteration or after a certain number of temperature adjustment iterations have been performed, such as described with respect to the method 300. A "temperature adjustment iteration" in this context may refer to adjustment of a temperature difference between a particular pair of adjacent temperatures and the corresponding adjustments to other variable temperatures to help maintain the swap acceptance probability of their respective pairs. Additionally or alternatively, a "temperature adjustment iteration" in this context may refer to the making of temperature adjustments after each $N_{adjust}$ number of swap attempts with respect to temperature differences between all adjacent pairs that are not within the threshold of the target swap acceptance probability.

At block 404, it may be determined whether the last temperature difference satisfies a temperature difference threshold. In instances in which the number of replicas is larger than necessary to achieve a target SAP, the temperature adjustment of the method 300 may be such that the gaps between the variable temperatures may get larger, which may result in the last temperature difference being reduced. As the last temperature difference gets smaller, the replicas associated with the last adjacent pair may approach coinciding with each other such that the swap acceptance probability of the last adjacent pair may approach one. Therefore, the temperature difference threshold may be set such that once the last difference is less than the temperature difference threshold, the highest variable temperature may be removed from the temperature ladder and its corresponding replica may also be removed.

In some embodiments, the temperature difference threshold may be based on the total temperature range between the fixed low temperature and the fixed high temperature. Additionally or alternatively, the temperature difference threshold may be based on a maximum number of replicas that may be used and consequently may be based on a maximum number of temperatures that may be included in the temperature ladder. The maximum number of replicas may be based on the constraints of the hardware used to implement the replica exchange process in some embodiments. Additionally or alternatively, the maximum number of replicas may be set based on processing efficiency and timing considerations. By way of example, in some embodiments, the temperature difference threshold $Threshold_r$ may be determined according to a fraction of the temperature range and the maximum number of replicas according to expression (9) below:

$$\text{Threshold}_r = \frac{T_H - T_L}{C \times M_{max}}$$

In expression (9), $T_H$ and $T_L$ may represent the fixed high temperature and the fixed low temperature, respectively, $M_{max}$ may represent the maximum number of replicas, and C may represent a constant number. C may be determined based on an empirical analysis and by way of example may have a range between 1 and 10 in some implementations.

In response to the last temperature difference satisfying the temperature difference threshold (e.g., being less than or equal to the temperature difference threshold), the method 400 may proceed from block 404 to block 406. At block 406, the highest variable temperature and its corresponding replica may be removed. The removal of the highest variable temperature may result in the previously second-to-highest variable temperature becoming the highest variable temperature.

In response to the last temperature difference not satisfying the temperature difference threshold (e.g., being greater than or equal to the temperature difference threshold), the method 400 may proceed from block 404 to block 408. At block 408, a swap acceptance probability may be determined based on the last temperature difference. In some embodiments, the swap acceptance probability may be determined using the fixed high temperature and the highest variable temperature in accordance with expression (5) described above with respect to FIG. 1A. The swap acceptance probability determined at block 408 may be referred to as the "last SAP."

At block 410, it may be determined whether the last SAP is within the target SAP threshold, such as that described above with respect to the method 300. In instances in which the number of replicas is too low, the temperature adjustment of the method 300 may be such that the gaps between the variable temperatures may get smaller, which may result in the last temperature difference increasing and consequently the last SAP may decrease to the point where the last SAP may not be within the target SAP threshold. Therefore, in response to the last SAP not being within the target SAP (which may be based on the last temperature difference), the method 400 may proceed from block 410 to block 412, where a replica may be added.

For example, a new variable temperature may be added between what was previously the highest variable temperature and the fixed high temperature. The new variable temperature may accordingly become the highest variable temperature. Additionally, a new replica may be assigned to the new variable temperature such that a new replica is added to the replica exchange process.

Returning to block 410, in response to the last SAP being within the target SAP, the method 400 may proceed from block 410 to block 414. At block 414, the number of replicas may be maintained.

Modifications, additions, or omissions may be made to the method 400 without departing from the scope of the present disclosure. For example, the operations of method 400 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

For example, in some embodiments, after blocks 412 or 414, the method 400 may return to block 402 to repeat one or more of the operations of the method 400. Additionally or alternatively, this process may be repeated any number of times until the method 300 is finished. Additionally or alternatively, the determinations made at blocks 404 and 410 to add or remove replicas may be performed after the same number of temperature adjustment iterations have been performed or after different numbers of temperature adjustment iterations have been performed.

Further, in some embodiments, the initial number of replicas may be set as the maximum number of replicas that may be run according to the specific hardware used to perform the replica exchange process. In these or other embodiments, the operations associated with replica addition may be omitted.

Figure 5:
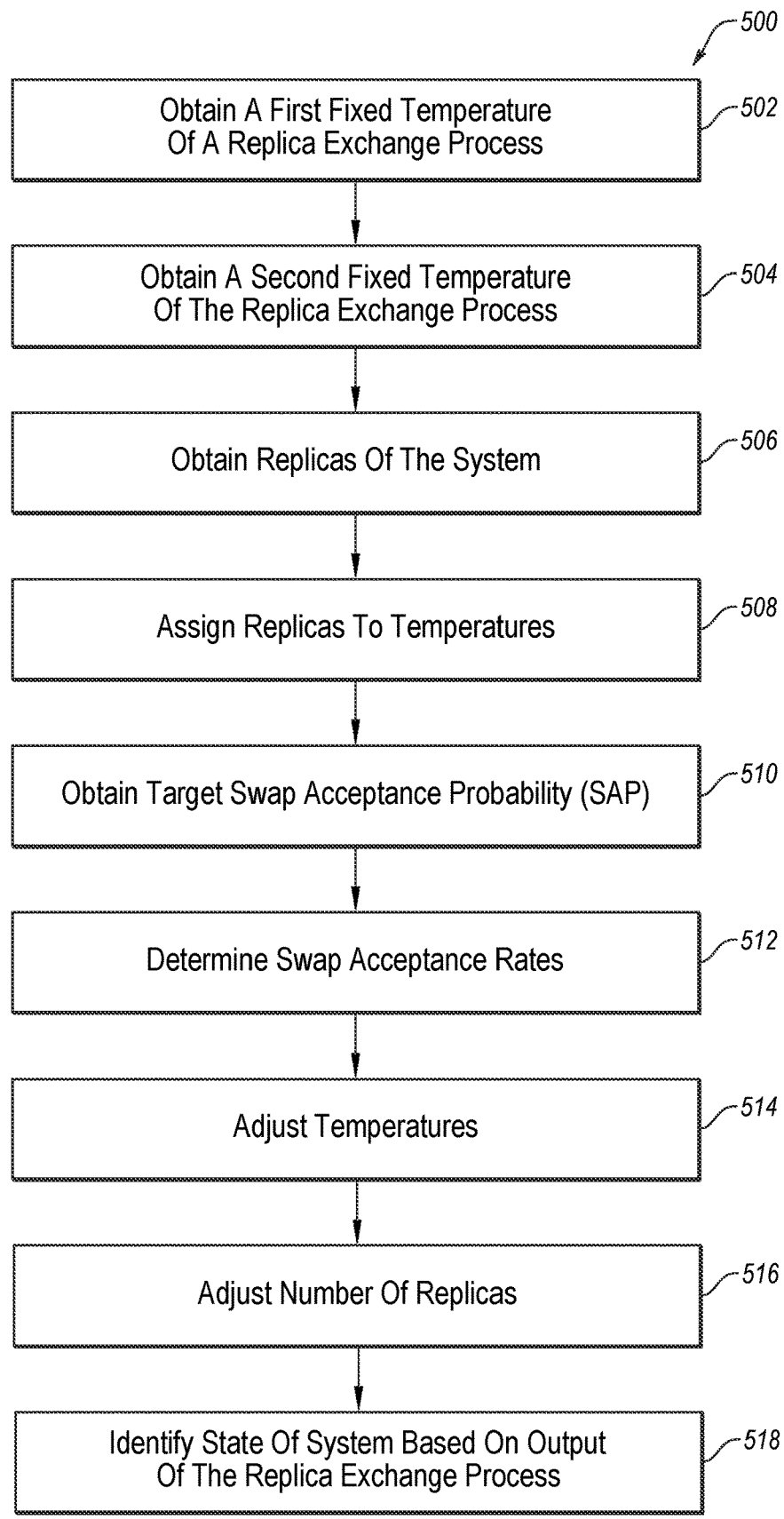
FIG. 5 illustrates a flowchart of an example method of performing a replica exchange process.

FIG. 5 illustrates a flowchart of an example method 500 of performing a replica exchange process, according to at least one embodiment described in the present disclosure. The method 400 may be performed by any suitable system, apparatus, or device. For example, the engine 102 of FIG. 1 or the computing system 202 of FIG. 2 may perform one or more of the operations associated with the method 400. Although illustrated with discrete blocks, the steps and operations associated with one or more of the blocks of the method 400 may be divided into additional blocks, combined into fewer blocks, or eliminated, depending on the particular implementation.

At block 502, a first fixed temperature of a replica exchange Markov Chain Monte Carlo (MCMC) process may be obtained. The replica exchange process may be used to solve an optimization problem associated with a system. The first fixed temperature may be a fixed high temperature or a fixed low temperature. In some embodiments, the first fixed temperature may be obtained as an input or may be determined. Additionally or alternatively, the first fixed temperature may be determined according to the description of determining the fixed high temperature or determining the fixed low temperature as described above with respect to FIG. 1A.

At block 504, a second fixed temperature of the replica exchange process may be obtained. The second fixed temperature may be a fixed high temperature or a fixed low temperature. For example, the second fixed temperature may be the fixed low temperature in instances in which the first fixed temperature is the fixed high temperature or vice versa. In some embodiments, the second fixed temperature may be obtained as an input or may be determined. Additionally or alternatively, the second fixed temperature may be determined according to the description of determining the fixed high temperature or determining the fixed low temperature as described above with respect to FIG. 1A.

At block 506, multiple replicas of the system to use in the replica exchange process may be obtained. In some embodiments, the replicas may be received as an input. Additionally or alternatively, the system may be received as an input and the replicas may be made from the system. The replicas may be obtained and/or configured as described above with respect to FIG. 1A in some embodiments. Additionally or alternatively, the number of initial replicas may be based on a maximum number of replicas that the computing system configured to perform the replica exchange process may be able to process. In these or other embodiments, the number of initial replicas may be somewhat arbitrarily determined because the replica addition or removal described above and implemented in the method 500, as described below, may automatically add or remove replicas to the number that may be needed.

At block 508, each replica of the replicas may be assigned to a different corresponding temperature of a set of temperatures. The number of temperatures in the set of temperatures may be the same number of replicas. Additionally, the set of temperatures may range between the first fixed temperature and the second fixed temperature. Further, the temperatures between the first fixed temperature and the second fixed temperature may be variable such that they may be adjusted as described above. Additionally, the variable temperatures may be numerically ordered between the first fixed temperature and the second fixed temperature. In some embodiments, the differences between the temperatures of the set of temperatures may be uniform upon initialization. Additionally or alternatively, the differences may vary. The initialization of the set of temperatures may be performed at any suitable time between obtaining the fixed temperatures and obtaining the replicas.

At block 510, a target swap acceptance probability (target SAP) may be obtained. As detailed in the description above, the target SAP may be a probability with respect to swapping, during the replica exchange process, between replicas that correspond to adjacently ordered variable temperatures of the plurality of variable temperatures. The target SAP may be obtained as an input or determined.

At block 512, a respective average SAP may be determined with respect to one or more respective adjacent pairs of the variable temperatures. Each respective average SAP may be with respect to swaps between replicas assigned to the one or more respective adjacent pairs. In some embodiments, the one or more operations of method 300 of FIG. 3 may be performed with respect to determining the average SAP.

At block 514, one or more of the variable temperatures may be adjusted based on a relationship between the target swap acceptance probability and each of one or more of the respective average SAPs. The temperature adjustment may be performed during the replica exchange process and may maintain the fixed first temperature and the fixed second temperature in which the fixed first temperature and the fixed second temperature may not be adjusted. In some embodiments, the one or more operations of method 300 of FIG. 3 may be performed with respect to adjusting the temperatures.

At block 516, a number of replicas may be adjusted based on based on a difference between the second fixed temperature and a particular variable temperature that is ordered adjacently to the second fixed temperature. For a minimization process, the second fixed temperature may be the high fixed temperature. For a maximization process, the second fixed temperature may be the low fixed temperature. The replica number adjustment may be performed during the replica exchange process. In some embodiments, the one or more operations of method 400 of FIG. 4 may be performed with respect to adjusting the temperatures.

At block 518, a particular state of the system may be identified as a solution to the optimization problem associated with the system. The particular state may include one or more state vectors of the replicas after the replica exchange process has converged.

Modifications, additions, or omissions may be made to the method 500 without departing from the scope of the present disclosure. For example, the operations of method 500 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

One or more embodiments of the present disclosure related to improvement of replica exchange techniques through the automatic temperature and/or replica number adjustment may be implemented in any number of different scenarios. For example, the replica exchange techniques detailed above may be integrated with parallel MCMC trial and update techniques in some embodiments. For instance, the automatic temperature and/or replica number adjustment may be implemented with respect to a parallel MCMC trial and update technique ("parallel technique") applied to a neural network that may be used to solve an optimization problem. An example of implementing the automatic temperature and/or replica number adjustment of replica exchange with a parallel technique may be found in the paper "Replica Exchange MCMC Hardware with Automatic Temperature Selection and Parallel Trial" by Dabiri et. al, IEEE TRANSACTIONS ON PARALLEL AND DISTRIBUTED SYSTEMS, available for online viewing after Jun. 20, 2020, which is incorporated by reference in the present disclosure in its entirety.

Additionally or alternatively, as indicated above, one or more embodiments of the present disclosure may be implemented through software programing. An example of pseudocode that may be used with respect to a software implementation may also be found in the Dabiri et. al paper.

Additionally or alternatively, as also indicated above, one or more embodiments of the present disclosure may be implemented in hardware, such as with an FPGA. For instance, an example FPGA implementation of integration of the automatic temperature and/or replica number adjustment of replica exchange with the parallel technique may also be found in the Dabiri et. al paper.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc.", or "at least one of A, B, or C, etc." or "one or more of A, B, or C, etc." is used, in general such a construction is intended to include A alone, B alone, C alone, A and B together, A and C together, B and C together, or A, B, and C together, etc. Additionally, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B" even if the term "and/or" is used elsewhere.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

The invention claimed is:

1. A method comprising:
obtaining a first fixed temperature of a replica exchange Markov Chain Monte Carlo (MCMC) process used to solve an optimization problem associated with a system;
obtaining a second fixed temperature of the replica exchange MCMC process;
obtaining a plurality of replicas of the system to use in the replica exchange MCMC process;
assigning each replica of the plurality of replicas to a different corresponding temperature of a set of temperatures of the replica exchange MCMC process, the set of temperatures including the first fixed temperature, the second fixed temperature, and a plurality of variable temperatures that are numerically ordered between the first fixed temperature and the second fixed temperature;
obtaining a target swap acceptance probability with respect to swapping, during the replica exchange MCMC process, between replicas that correspond to adjacently ordered variable temperatures of the plurality of variable temperatures;
executing the replica exchange MCMC process by executing, on a hardware platform, each replica of the system at its corresponding assigned temperature;
determining, during execution of the replica exchange MCMC process on the hardware platform, a respective average swap acceptance probability with respect to one or more respective adjacent pairs of the plurality of variable temperatures, each respective swap acceptance probability being with respect to swaps between replicas assigned to the one or more respective adjacent pairs;
adjusting, during the replica exchange MCMC process while maintaining the first fixed temperature and the second fixed temperature, one or more of the variable temperatures based on a relationship between the target swap acceptance probability and each of one or more of the respective swap acceptance probabilities;
adjusting, during the replica exchange MCMC process, a number of replicas executed by the hardware platform during the replica exchange MCMC process, the adjusting of the number of replicas being based on a difference between the second fixed temperature and a particular variable temperature that is ordered adjacently to the second fixed temperature; and
identifying, based on an output of the replica exchange MCMC process, a particular state of the system as a solution to the optimization problem associated with the system.

2. The method of claim 1, wherein adjusting the number of replicas includes removing the particular variable temperature and removing a particular replica that corresponds to the particular variable temperature.

3. The method of claim 1, wherein adjusting the number of replicas includes inserting a new variable temperature between the second fixed temperature and the particular variable temperature and assigning a new replica to the new variable temperature.

4. The method of claim 1, wherein adjusting the number of replicas based on the difference between the second fixed temperature and the particular variable temperature is in response to the difference between the second fixed temperature and the particular variable temperature satisfying a temperature difference threshold.

5. The method of claim 1, wherein adjusting the number of replicas based on the difference between the second fixed temperature and the particular variable temperature includes:
determining, based on the difference between the second fixed temperature and the particular variable temperature, a particular swap acceptance probability with respect to a particular swap between a first replica that corresponds to the particular variable temperature and a second replica that corresponds to the second fixed temperature; and
adjusting the number of replicas based on a relationship between the particular swap acceptance probability and the target swap acceptance probability.

6. The method of claim 1, wherein obtaining the second fixed temperature includes determining the second fixed temperature based on a relationship between a particular swap acceptance probability and the second fixed temperature.

7. One or more non-transitory computer-readable storage media configured to store instructions that, in response to being executed, cause a system to perform operations, the operations comprising:
obtaining a first fixed temperature of a replica exchange Markov Chain Monte Carlo (MCMC) process used to solve an optimization problem associated with a system;
obtaining a second fixed temperature of the replica exchange MCMC process;
obtaining a plurality of replicas of the system to use in the replica exchange MCMC process;
assigning each replica of the plurality of replicas to a different corresponding temperature of a set of temperatures of the replica exchange MCMC process, the set of temperatures including the first fixed temperature, the second fixed temperature, and a plurality of variable temperatures that are numerically ordered between the first fixed temperature and the second fixed temperature;
obtaining a target swap acceptance probability with respect to swapping, during the replica exchange MCMC process, between replicas that correspond to adjacently ordered variable temperatures of the plurality of variable temperatures;
executing the replica exchange MCMC process by executing, on a hardware platform, each replica of the system at its corresponding assigned temperature;
determining, during execution of the replica exchange MCMC process on the hardware platform, a respective average swap acceptance probability with respect to one or more respective adjacent pairs of the plurality of variable temperatures, each respective swap acceptance probability being with respect to swaps between replicas assigned to the one or more respective adjacent pairs;
adjusting, during the replica exchange MCMC process while maintaining the first fixed temperature and the second fixed temperature, one or more of the variable temperatures based on a relationship between the target swap acceptance probability and each of one or more of the respective swap acceptance probabilities;
adjusting, during the replica exchange MCMC process, a number of replicas executed by the hardware platform during the replica exchange MCMC process, the adjusting of the number of replicas being based on a difference between the second fixed temperature and a particular variable temperature that is ordered adjacently to the second fixed temperature; and identifying, based on an output of the replica exchange MCMC process, a particular state of the system as a solution to the optimization problem associated with the system.

8. The one or more computer-readable storage media of claim 7, wherein adjusting the number of replicas includes removing the particular variable temperature and removing a particular replica that corresponds to the particular variable temperature.

9. The one or more computer-readable storage media of claim 7, wherein adjusting the number of replicas includes inserting a new variable temperature between the second fixed temperature and the particular variable temperature and assigning a new replica to the new variable temperature.

10. The one or more computer-readable storage media of claim 7, wherein adjusting the number of replicas based on the difference between the second fixed temperature and the particular variable temperature is in response to the difference between the second fixed temperature and the particular variable temperature satisfying a temperature difference threshold.

11. The one or more computer-readable storage media of claim 7, wherein adjusting the number of replicas based on the difference between the second fixed temperature and the particular variable temperature includes:

determining, based on the difference between the second fixed temperature and the particular variable temperature, a particular swap acceptance probability with respect to a particular swap between a first replica that corresponds to the particular variable temperature and a second replica that corresponds to the second fixed temperature; and adjusting the number of replicas based on a relationship between the particular swap acceptance probability and the target swap acceptance probability.

12. The one or more computer-readable storage media of claim 7, wherein obtaining the second fixed temperature includes determining the second fixed temperature based on a relationship between a particular swap acceptance probability and the second fixed temperature.

13. The one or more computer-readable storage media of claim 7, wherein the first fixed temperature is a fixed low temperature and the second fixed temperature is a fixed high temperature.

14. A system comprising:

hardware configured to perform operations, the operations comprising:

obtaining a first fixed temperature of a replica exchange Markov Chain Monte Carlo (MCMC) process used to solve an optimization problem associated with a system;

obtaining a second fixed temperature of the replica exchange MCMC process;

obtaining a plurality of replicas of the system to use in the replica exchange MCMC process;

assigning each replica of the plurality of replicas to a different corresponding temperature of a set of temperatures of the replica exchange MCMC process, the set of temperatures including the first fixed temperature, the second fixed temperature, and a plurality of variable temperatures that are numerically ordered between the first fixed temperature and the second fixed temperature;

obtaining a target swap acceptance probability with respect to swapping, during the replica exchange MCMC process, between replicas that correspond to adjacently ordered variable temperatures of the plurality of variable temperatures;

executing the replica exchange MCMC process by executing, on a hardware platform, each replica of the system at its corresponding assigned temperature;

determining, during execution of the replica exchange MCMC process on the hardware platform, a respective average swap acceptance probability with respect to one or more respective adjacent pairs of the plurality of variable temperatures, each respective swap acceptance probability being with respect to swaps between replicas assigned to the one or more respective adjacent pairs;

adjusting, during the replica exchange MCMC process while maintaining the first fixed temperature and the second fixed temperature, one or more of the variable temperatures based on a relationship between the target swap acceptance probability and each of one or more of the respective swap acceptance probabilities; and adjusting, during the replica exchange MCMC process, a number of replicas executed by the hardware platform during the replica exchange MCMC process, the adjusting of the number of replicas being based on a difference between the second fixed temperature and a particular variable temperature that is ordered adjacently to the second fixed temperature;

identifying, based on an output of the replica exchange MCMC process, a particular state of the system as a solution to the optimization problem associated with the system.

15. The system of claim 14, wherein adjusting the number of replicas includes removing the particular variable temperature and removing a particular replica that corresponds to the particular variable temperature.

16. The system of claim 14, wherein adjusting the number of replicas includes inserting a new variable temperature between the second fixed temperature and the particular variable temperature and assigning a new replica to the new variable temperature.

17. The system of claim 14, wherein adjusting the number of replicas based on the difference between the second fixed temperature and the particular variable temperature is in response to the difference between the second fixed temperature and the particular variable temperature satisfying a temperature difference threshold.

18. The system of claim 14, wherein adjusting the number of replicas based on the difference between the second fixed temperature and the particular variable temperature includes:

determining, based on the difference between the second fixed temperature and the particular variable temperature, a particular swap acceptance probability with respect to a particular swap between a first replica that corresponds to the particular variable temperature and a second replica that corresponds to the second fixed temperature; and adjusting the number of replicas based on a relationship between the particular swap acceptance probability and the target swap acceptance probability.

* * * * *